United States Patent
Pedersen

(10) Patent No.: US 7,249,935 B2
(45) Date of Patent: Jul. 31, 2007

(54) LIGHTNING PROTECTION MEANS FOR A WIND TURBINE

(75) Inventor: Bent Hersø Pedersen, Randers (DK)

(73) Assignee: NEG Micon A/S, Randers (DK)

( * ) Notice: Subject to any disclaimer, the term of this patent is extended or adjusted under 35 U.S.C. 154(b) by 43 days.

(21) Appl. No.: 10/517,068

(22) PCT Filed: Jun. 19, 2003

(86) PCT No.: PCT/DK03/00413

§ 371 (c)(1),
(2), (4) Date: May 20, 2005

(87) PCT Pub. No.: WO04/001224

PCT Pub. Date: Dec. 31, 2003

(65) Prior Publication Data

US 2006/0013695 A1    Jan. 19, 2006

(30) Foreign Application Priority Data

Jun. 19, 2002 (DK) .................. PA 2002 00935

(51) Int. Cl.
*A47C 7/74* (2006.01)
(52) U.S. Cl. ................. 416/146 R; 416/229 R
(58) Field of Classification Search .......... 416/146 R, 416/229 R, 230, DIG. 4, DIG. 6; 415/4.3; 290/44, 55
See application file for complete search history.

(56) References Cited

U.S. PATENT DOCUMENTS

| | | | |
|---|---|---|---|
| 4,449,053 A * | 5/1984 | Kutcher | 290/44 |
| 5,716,193 A | 2/1998 | Mondet et al. | |
| 6,612,810 B1 * | 9/2003 | Olsen et al. | 416/95 |
| 6,979,179 B2 * | 12/2005 | Møller Larsen | 416/223 R |
| 7,040,864 B2 * | 5/2006 | Johansen et al. | 416/146 R |

FOREIGN PATENT DOCUMENTS

| | | |
|---|---|---|
| DE | 11195 | 10/1880 |
| DE | 44 36 197 A1 | 4/1996 |
| DE | 197 48 716 C | 11/1998 |
| DE | 10022128 C1 * | 12/2001 |
| EP | 0 718 495 A | 6/1996 |
| EP | 1 036 937 A2 | 9/2000 |
| EP | 1 154 537 A | 11/2001 |
| JP | 2001-123934 A | 5/2001 |
| WO | WO-01/86144 A1 | 11/2001 |
| WO | WO-03/054389 A1 | 7/2003 |

OTHER PUBLICATIONS

Vestas Total Lighting Protection for 600, 660 kW and 1.65 MW Wind Turbines.
Recommendation 25 Lighting protection of wind turbines Edition 1, Jan. 1999, pp. 1-38.

* cited by examiner

Primary Examiner—Igor Kershteyn
(74) Attorney, Agent, or Firm—Birch, Stewart, Kolasch & Birch, LLP

(57) ABSTRACT

A lightning protection device which is capable of avoiding electrical current, which is being induced in the blades of wind turbine, from being passed to parts of the wind turbine that may be damaged or destroyed by the electrical current. The electrical current is passed along by electrical conductors extending from the blades to a stationary part of the wind turbine. A flange for mounting the hub of the wind turbine to the main shaft is provided where the electrical conductors lead either through or past the mounting flange.

57 Claims, 11 Drawing Sheets

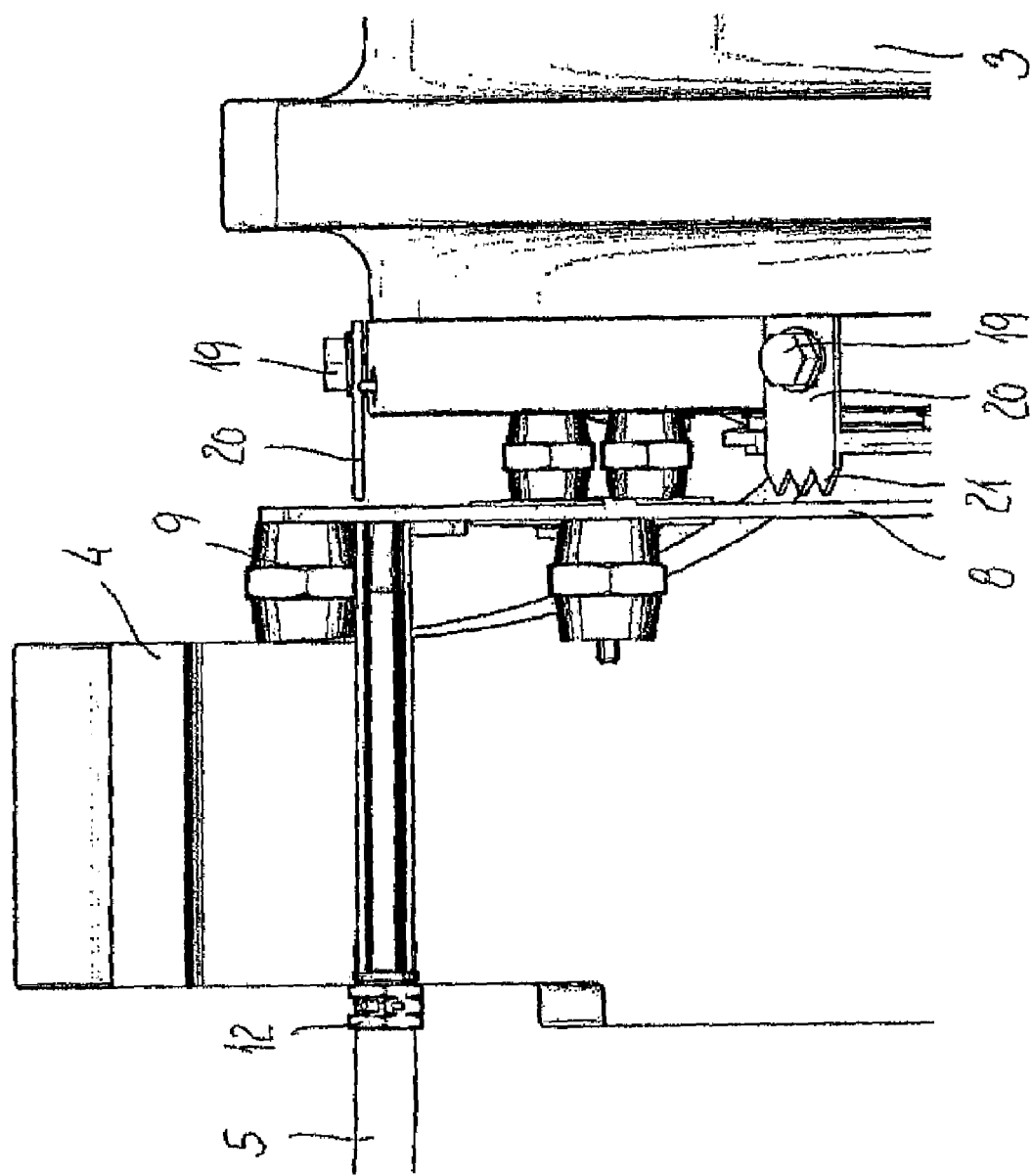

LIGHTNING PROTECTION MEANS FOR A WIND TURBINE

FIELD OF THE INVENTION

The present invention relates to a wind turbine with lightning protection means, said means comprising means for conducting an electrical current induced by a lightning, said means capable of conducting the electrical current from blades of the wind turbine and to the nacelle of the wind turbine, through the hub and to a stationary part of the wind turbine by leading the electric conductor means past a flange for mounting the hub to a main shaft of the wind turbine, said stationary part of the wind turbine being stationary in relation to the mounting flange during operation of the wind turbine.

BACKGROUND OF THE INVENTION

Different kinds of means are known for protecting electrically fragile parts of wind turbines from lightning. One kind of means is intended for avoiding the electrical current from a lightning striking the blades of the wind turbine from entering the generator and other electrical and electronic components situated in the top of the wind turbine. This is done by conducting the electrical current from the blades to the tower of the wind turbine and to the ground.

WO 01/86144 describes a wind turbine with such a lightning protection system. The lightning protection system comprises a rod mounted to the blades of the wind turbine. The stick is mounted at the base of the blades. The rod is intended as lightning conducting means conducting the lightning from the base of the blades to a conducting ring mounted co-axially around the main shaft, outside the housing of the nacelle. From this conducting ring the electrical current is conducted through the machine carrying elements provided in the nacelle and further on to the tower along a slip means provided at the yawing gear. Thereby, the conducting of the electrical current is independent of the actual rotary position of the machine carrying elements in the nacelle compared to the tower.

The apparatus described in the above WO-publication is said to be capable of ensuring that no electrical current from the lightning damages the electrical and electronic components. However, the invention is not so described as to enable the person skilled in the art to obtain this object. Also, the means by which the lightning protection is provided has disadvantages. Firstly, providing a separate conducting ring outside and around the entire nacelle demands a very large ring and when mounted, though very difficult, inflicting the aerodynamic properties of the wind turbine nacelle. Also, how the large conducting ring is suspended in relation to the machine carrying elements of the nacelle is not described. Accordingly, the mounting of the conducting ring, which, as mentioned, is one of the major disadvantages of the apparatus, is not mentioned. Therefore, the person skilled in the art will not only be posed to the disadvantages apparent from the description, i.e. the large conducting ring, but will also have to apply a very inventive skill in order to overcome the problem of how to mount the large conducting ring.

DE 197 48 716 describes a lightning protection system comprising at least two conductors inside the turbine blade. The one conductor leads to one side of a transformer, said transformer being capable of generating electrical current in the conductor for heating the blade. However, the one conductor also functions as lightning conductor. In this case, the conductor is connected either directly to the hub as shown in FIG. 1, or to a separate ring provided around the main axle and outside the nacelle of the wind turbine as shown in FIG. 2, or to a separate lightning rod as shown in FIG. 3 and situated outside the nacelle and conducting the lightning voltage to any metal part in the vicinity of the lightning rod.

EP 0 718 495 describes a lightning conductor very like the one shown and described in WO 01/86144. Thus, a separate conductor ring is provided around the main shaft outside the nacelle. A conductor plate, also provided outside the nacelle conducts the lightning form the separate conductor ring to the tower of the wind turbine and therefrom to the ground. The lightning voltage is passed from the turbine blade via a spark gap to the separate conductor ring, from the separate conductor ring via a spark gap to the separate conductor plate and from the separate conductor plate via a spark gap to the tower.

EP 1 154 537 describes a lightning conductor comprising a slip ring provided around the main shaft and brushes passing lightning voltage from the slip ring to a fixed structure secured to the body of the wind turbine. The fixed structure serves as a protection shield for the generator of the wind turbine. The lightning voltage is passed from lightning conductors in the blade along an exteriorly placed cable to the slip ring, and from the slip ring to brushes and the protection shield being part of the fixed structure of the turbine.

It is the object of the present invention to provide a lightning protection means for a wind turbine, said means providing the necessary protection of the electrical and electronic components of the wind turbine, and being easy to install, both in the sense of the craftsman-like skills necessary, and also in sense of the number of and the type of components used, seeing that the lightning protection means is to be installed and serviced in the nacelle of the wind turbine, high above ground level or sea level.

SUMMARY OF THE INVENTION

This object is obtained by wind turbine lightning protection means, where leading of the electrically conducting means past the mounting flange is established by one of the following means: Fastening means provided in or attached to the circumference of the mounting flange for fastening the electrically conducting means to the circumference of the mounting flange, or through-going holes in the mounting flange for passing the electrically conducting means through the mounting flange.

By leading the electrical current along the electrical conductor through the hub, all of the lightning protection system will be kept within the boundaries of the hub, thus neither necessitating specially adapted means for suspending the lightning protection means to the hub or the nacelle, nor obstructing or impeding the aerodynamic properties of the wind turbine. However, passing the electrical conductors through the hub incur problems when having to pass the electrical conductors from the hub to the tower. This is accomplished by passing the electrical conductors either past the circumference of the mounting flange of the hub or by passing the electrical conductors through holes in the mounting flange. Thereby, all of the lightning protection system will be kept within the boundaries of the nacelle as well, thus also assisting in not obstructing or impeding the aerodynamic properties of the wind turbine.

Passing the electrical current from the mounting flange to the nacelle may take place in any suitable manner. However, due to the fact that the mounting flange is rotating along with the main shaft and the hub, when the wind turbine is functioning, the present invention, in a preferred embodiment, makes use of special provisions for passing the electrical current from the mounting flange to a stationary part of the wind turbine.

In a first embodiment, the electrically conducting member comprises an annular member provided around the main shaft of the wind turbine, and said annular member being electrically insulated from the mounting flange and from the main shaft, and where the annular member is attached to the mounting flange, thus rotating with the mounting flange, the main shaft and the hub during operation of the wind turbine, and where slip means are provided between the annular member and the stationary part of the wind turbine, said slip means conducting the electrical current from the annular member to the stationary part.

In a second embodiment, the electrically conducting member comprises an annular member provided around the main shaft of the wind turbine, and said annular member being electrically insulated from the mounting flange and from the main shaft, and where the annular member is attached to the stationary part of the wind turbine, thus not rotating with the mounting flange, the main shaft and the hub during operation of the wind turbine, and where slip means are provided between the annular member and the mounting flange, said slip means conducting the electrical current from the mounting flange to the annular member.

In principle, there is no difference in the individual parts and the function of the first embodiment and the second embodiment for passing the electrical current from the mounting flange to the tower via a stationary part of the wind turbine in relation to the mounting flange. The only difference is, whether the annular member is attached to the mounting flange and thus rotates along with the flange during operation of the wind turbine, with the lightning current receptors being stationary, or whether the annular member in stead is mounted to the stationary part of the wind turbine in relation to the mounting flange and thus the lightning current receptors being attached to and rotating along with the mounting flange during operation of the wind turbine.

The slip between the lightning current receptors and the annular member may also be accomplished in different ways. By slip is meant slip in its broadest understanding, i.e. not in the strict electrical understanding, the slip means thus being means allowing a mutual displacement between the annular member and the stationary part, but still being capable of conducting the electrical current induced by a lightning striking one or more of the blades of the wind turbine and being passed to the slip means.

One embodiment according to the invention makes use of metal brushes constituting the tip of the lightning current receptors. A second embodiment makes use of carbon brushes constituting the tip of the lightning current receptors, such as frequently used in electrical generators and electrical motors. A third and preferred embodiment makes use of a small gap between a pointed tip of the lightning current receptors and the annular member, thus creating a spark, when the current is led from the mounting flange to the stationary part.

An overall object of the different possible embodiments according to the invention for conducting the electrical current from the blades of the wind turbine to the stationary part in relation to the mounting flange is to avoid electrical current being passed through sensitive parts and components in the nacelle and possible other parts of the wind turbine. Thus, it is important to assure that parts such as bearings and components such as the generator will not be affected by the electrical current induced by the lightning and being passed to the stationary part in relation to the mounting flange. A stationary part in relation to the mounting flange may be any part of the wind turbine apart from the blades, the hub and the main shaft.

BRIEF DESCRIPTION OF THE DRAWINGS

The invention will now be described with reference to the accompanying drawings, where FIG. 11 is a cross-sectional view of the possible yet other embodiment of a lightning current receptor constituting part of the lightning protection system according to the invention.

DETAILED DESCRIPTION OF THE INVENTION

Figure 1:
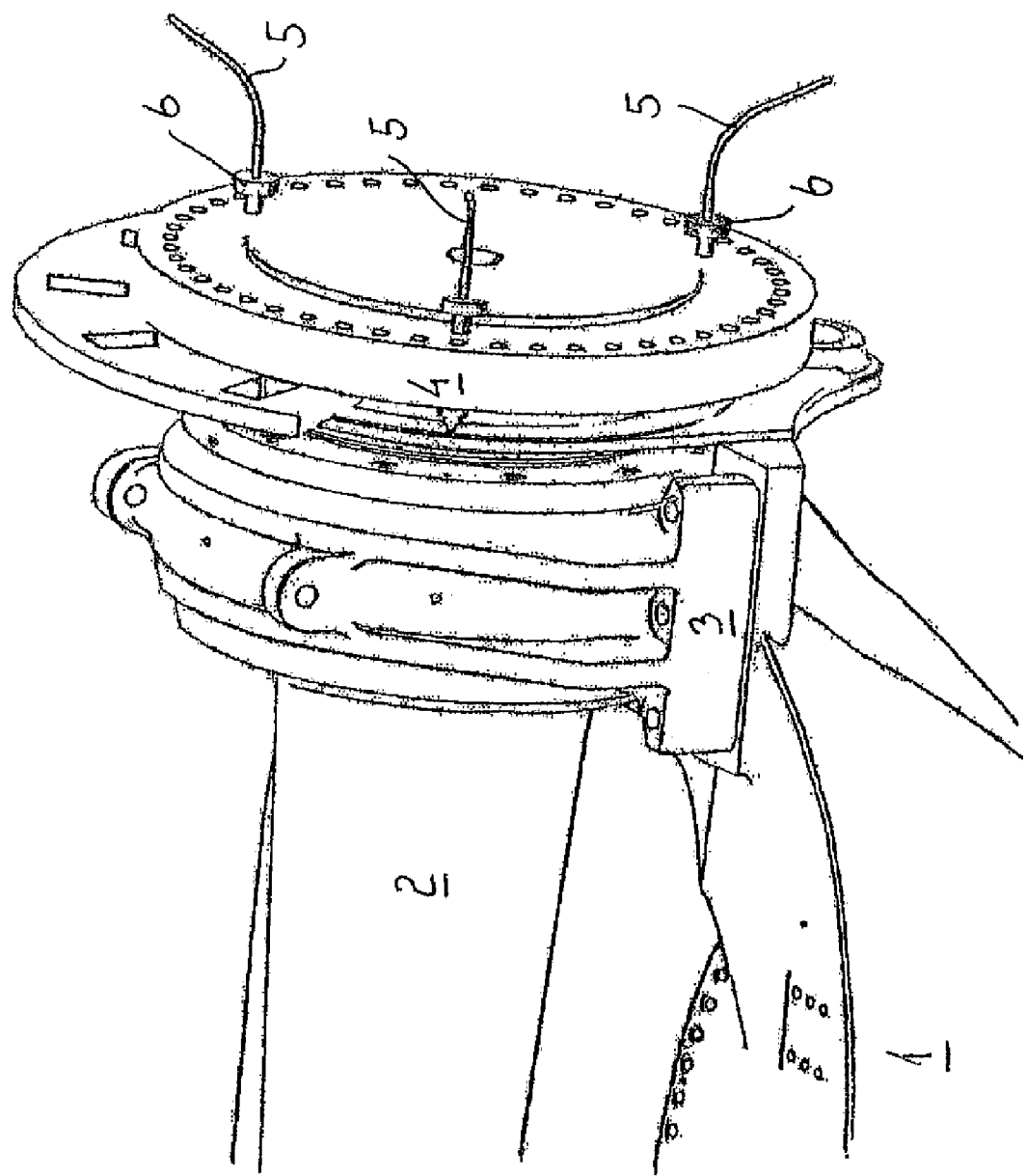
FIG. 1 is a perspective view of an embodiment of the lightning protection means according to the invention, also with other parts the wind turbine shown.

FIG. 1 is a view showing parts of a wind turbine with lightning protection means being installed. The parts of the wind turbine are a nacelle 1 being in connection with a tower (not shown) of the wind turbine, a main shaft 2, a front bearing 3 for the main shaft, and a mounting flange 4 constituting a part of the main shaft, and for mounting a hub (not shown) to the front end of the main shaft. The bearing 3 is secured to the nacelle 1.

The lightning protection means comprises electrical conductors 5 intended for passing inside the shelf of the hub, insulating sleeves 6 intended for passing the electrical conductors through specially adapted holes 7 (see FIG. 2) in the mounting flange and an annular member 8 (see FIG. 2) being attached to the mounting flange by means of bushings 9 (see FIG. 2) and intended for rotating with the mounting flange when the wind turbine is functioning.

Thus, the electrical conductors lead from the base of the blades (not shown) of the wind turbine, into the hub (not shown) into the specially provided holes 7 in the mounting flange and to the annular member 8 attached to the opposite side of the mounting flange, namely the rear side of the mounting flange, compared to the front side of the mounting flange, onto which front side the hub is mounted by means of the mounting holes shown provided in the outer vicinity of the circumference of the mounting flange.

In an alternative embodiment, the electrical conductors do not pass through holes in the mounting flange, but pass the circumference of the mounting flange so that specially provided holes need not be provided in the mounting flange. In an embodiment like this, notches may be formed in the circumference of the mounting flange, or even easier, clamps may be attached to the mounting flange, said clamps fastening cables or other electrically conducting means to the circumference of the mounting flange.

Figure 2:
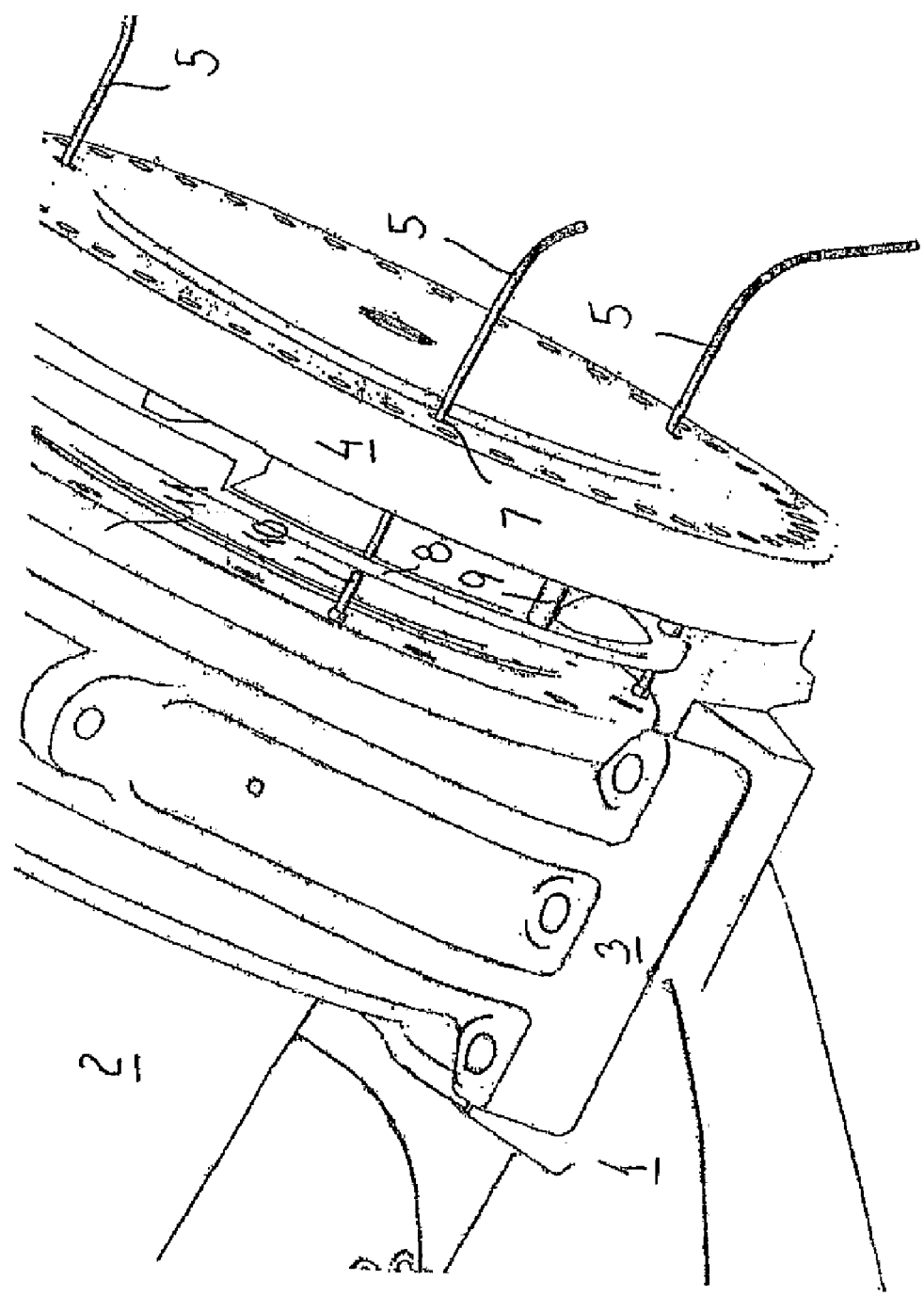
FIG. 2 is a perspective view of the embodiment viewed from the side and showing the pathway for the current when passing from the hub to the tower.
Figure 3:
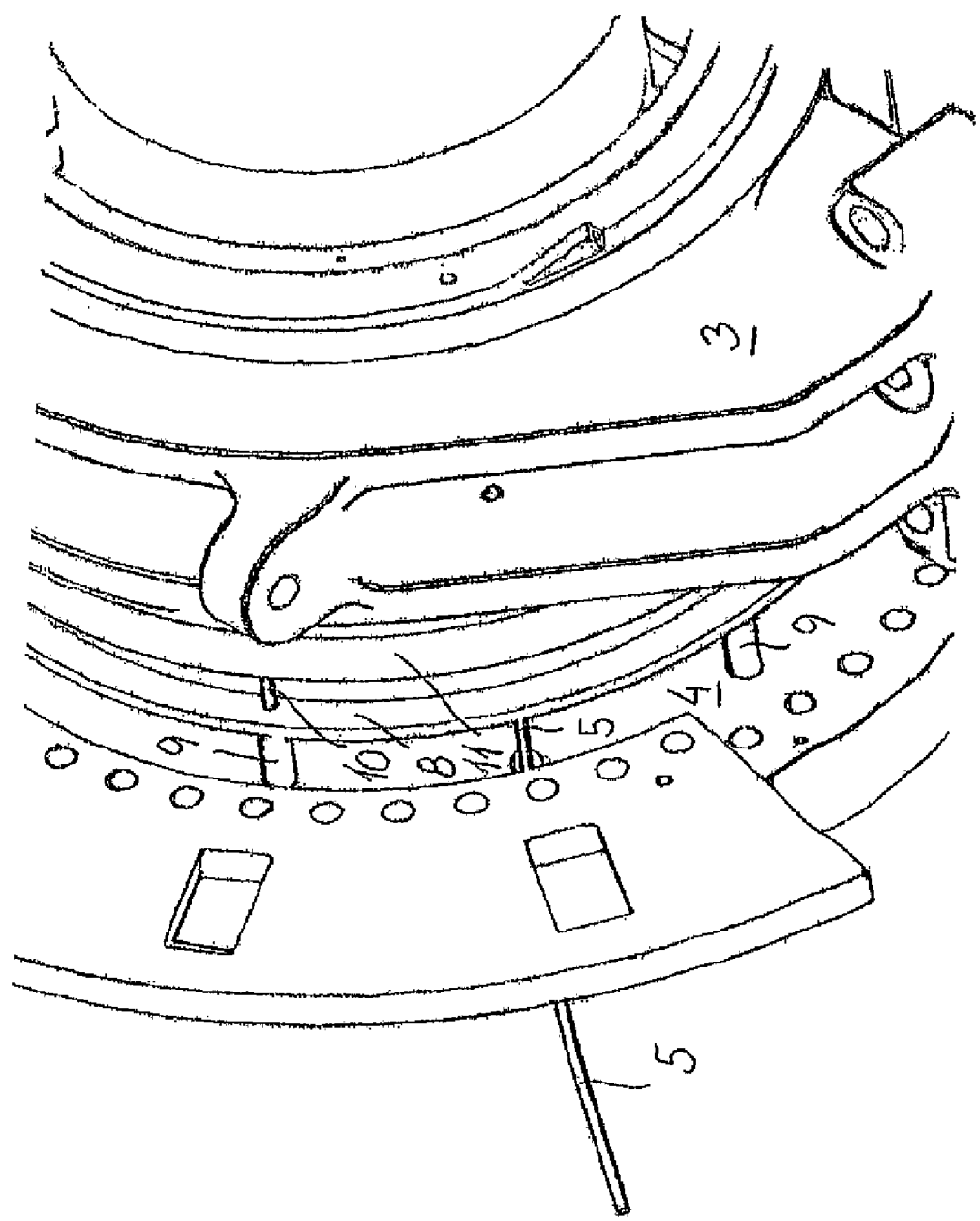
FIG. 3 is a perspective view of the embodiment viewed from the behind, also showing the pathway for the current when passing from the hub to the tower

FIG. 2 and FIG. 3 are close-up views seen substantially from the side and seen from the rear, respectively, of how the lightning protection means is placed in relation to each other and in relation to the parts of the wind turbine. As mentioned above, the electrical conductors 5 pass from the hub (not shown) through the specially provided holes 7 in the mounting flange 4. As mentioned, electrically insulating sleeves (see FIG. 1) are provided in the holes 7 for electrically insulating the electrical conductors 5 from the mounting flange 4. However, if the electrical conductors themselves are provided with insulation thick enough, the electrically insulating sleeves may be omitted.

In the embodiment shown, three electrical conductors are shown, one from each blade of a conventional wind turbine, and three corresponding holes are provided in the mounting flange. However, wind turbines having another number of blades may be provided with another number than three electrical conductors and corresponding holes. However, wind turbines having three blades may nevertheless have all three blades connected to one and the same conductor passing though only one hole in the mounting flange.

When the electrical conductors 5 have passed the mounting flange 4 through the holes 7, the electrical conductors are passed to the annular member 8. The annular member is electrically insulated from the mounting flange by being attached to the mounting flange using electrically insulating bushings 9 establishing a certain axial distance between the mounting flange and the annular member. Opposing the annular member, a number of lightning current receptors 10 are provided.

The lightning current receptors 10 are mounted in a ring 11 being electrically in contact with the basis of the tower, i.e. the ground of the sea, either along the tower itself or along wires leading through the tower to the basis. The electrical contact may be provided through the bearing 3 for the main shaft 2, or it may be provided separate from the bearing. The number of lightning current receptors is arbitrary. The lightning current receptors have a pointed tip, and a small gap (not shown) is provided between the pointed tip of the lightning current receptors and the annular member. The size of the gab depends on the number of lightning current receptors and depends on the size of electrical current, which is expected during lightning, or which is intended for being conducted from the blades of the wind turbine and to the ground or sea. Preferably the size of the gab is between 1 mm and 10 mm, more preferably between 1 mm and 5 mm.

In alternative embodiments, the current is passed from the annular member to the lightning current receptors by means of metal brushes or carbon brushes constituting the tips of the lightning current receptors in stead of the pointed tip and abutting the annular member, thus passing the electrical current form the annular member to the lightning current receptors without creating a spark.

Figure 4:
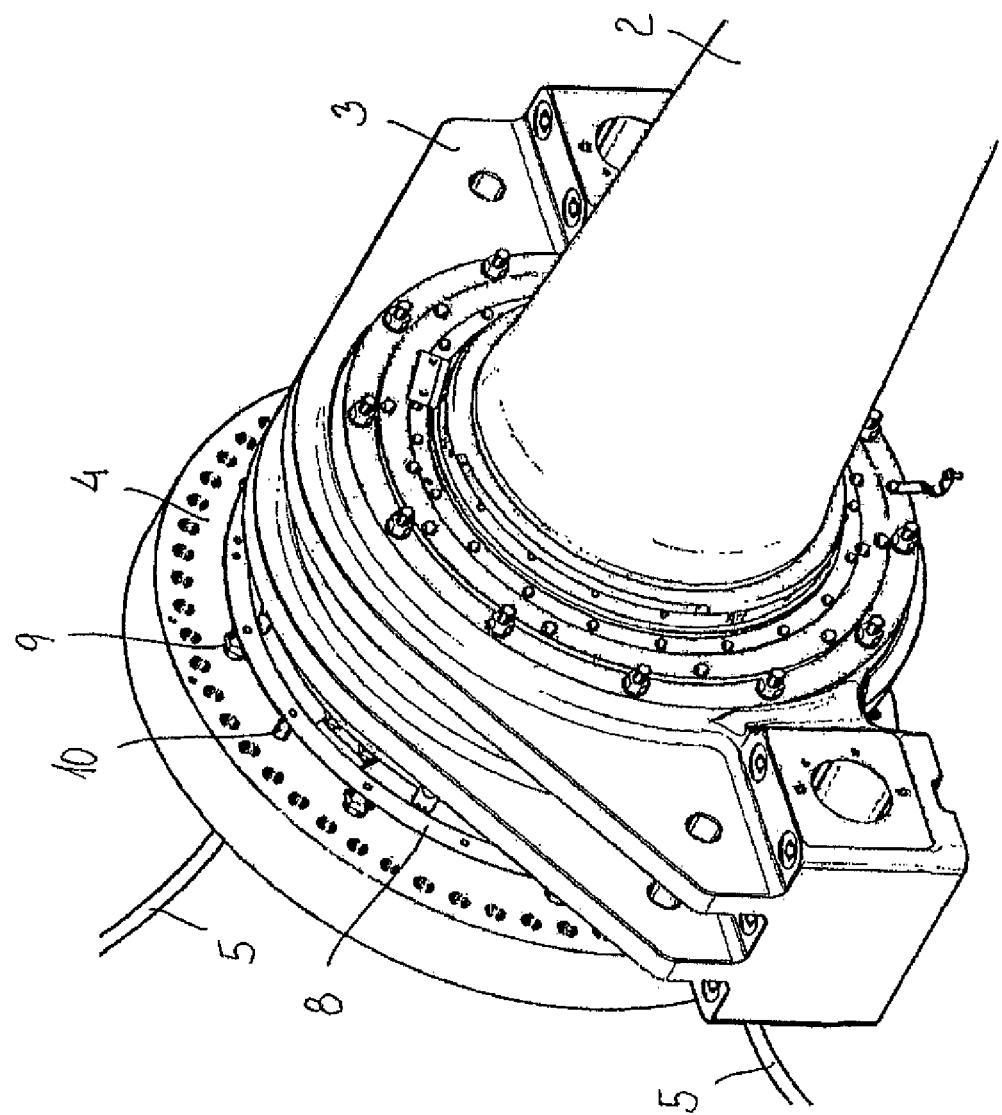
FIG. 4 is a perspective view of another embodiment of the lightning protection means according to the invention, also with other parts the wind turbine shown.

FIGS. 4-7 are different views of another possible embodiment of a lightning protection system. FIG. 4 shows from the rear side 4B of the mounting flange 4 the main shaft 2 of the wind turbine together with the front bearing 3 of the main shaft. The mounting flange 4 of the main shaft is shown with a plurality of holes for mounting the hub (not shown) of the wind turbine to the main shaft 2. Electrical conducting cables 5 lead from the hub (not shown) to insulating sleeves 6 with further electrical conductors inserted into specially adapted holes 7 (not shown) in the mounting flange 4. After having been passed trough the mounting flange 4, the electrical conductors 5 are being led to the annular member 8.

Figure 5:
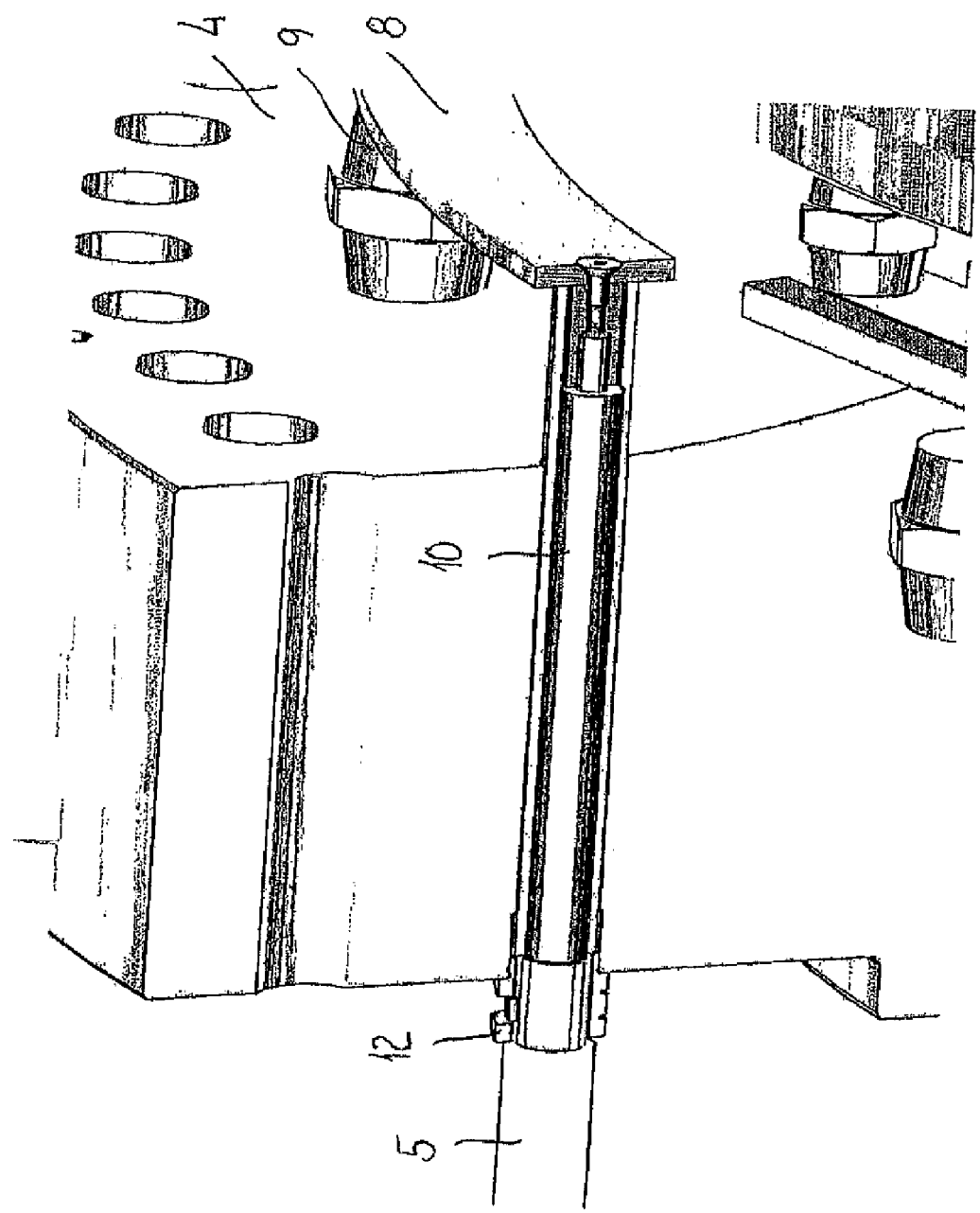
FIG. 5 is a cross-sectional and perspective view of parts of the other embodiment of the lightning protection means according to the invention.

FIG. 5 shows in greater detail and in a cross-sectional view the leading of the electrical conductors 5 through the mounting flange 4 and to the annular member 8. An electrically insulated cable 5 such as a standard cable gland PG29 with amour earth ring and metric wire is situated in the hub and lead from one of the blades mounted to the hub. As mentioned, a specially adapted hole 7 is provided in the mounting flange 4. Through the hole 7, a standard APE constituting the insulating sleeve 6 is passed through the hole 7 to the annular member 8. The cable 5 is attached to a proximate end 6A of the APE by means of a cable plug 12. The annular member 8 is attached to a distant end 6B of the APE by means of small bolts 13. In a possible embodiment as shown, the bolts 13 have bolt heads being flush with or at least not extending beyond the surface 8B of the annular member facing lightning current receptors (see FIGS. 8-11). The annular member 8 is secured to a rear side of the mounting flange 4 by means of electrically insulating insulators 9.

The electrically insulating insulators 9 are standard insulators being provided with threaded bolts in one end (see FIG. 7), and around the body of the insulator means for rotating the insulator is provided, such as a six-edged circumference 14 as shown for rotating the insulators by means of a wrench. When rotating the insulator the threaded end (see FIG. 7) in the one end of the insulator is screwed into a corresponding threaded hole (not shown) in the rear side of the mounting flange. A threaded hole in the other end of the insulator is used for accommodating a correspondingly threaded bolt screwed into the threaded hole (not shown) through a hole (not shown) in the annular member 4.

Alternatively, the insulator 9 may be provided with threaded bolts in both ends, and the annular member being provided with a correspondingly threaded hole. Rotation of the insulator 9 will thus result in each of the threaded bolts being screwed into the corresponding threaded holes in the mounting flange and in the annular member, respectively. By any of the two attachment possibilities mentioned, an easy and secure attachment of the annular member to the rear side of the mounting flange is obtained. If the annular member were to be attached to the bearing in stead, similar attachment as the ones described above could easily be adopted.

Figure 6:
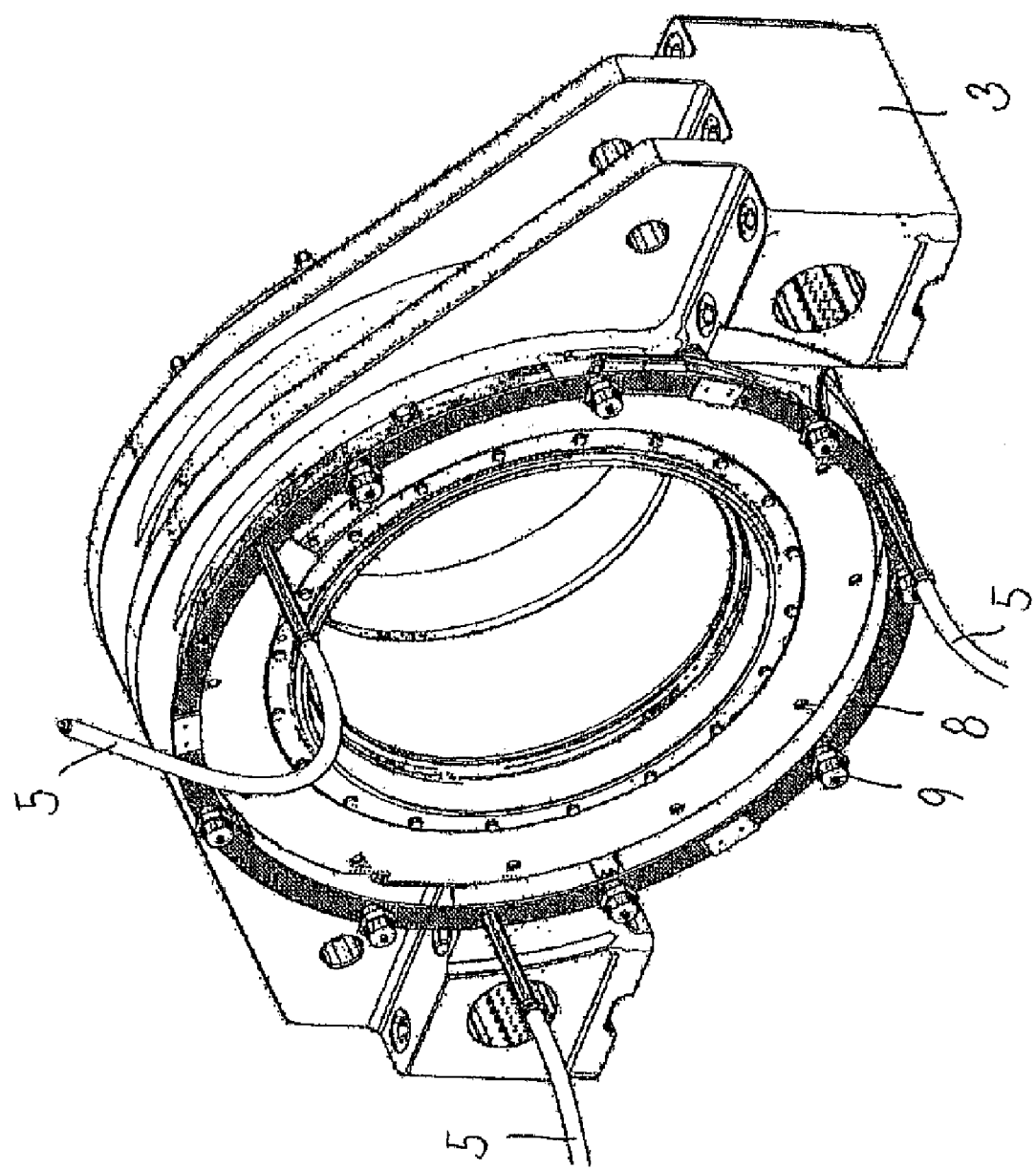
FIG. 6 is a perspective view of parts of the other embodiment of the lightning protection means according to the invention, also with other parts the wind turbine shown.

FIG. 6 shows a different view than the view shown in FIG. 4, namely the lightning protection system seen from the front side 4A of the mounting flange 4. For the sake of clarity, the mounting flange 4 is however not shown. Also the main shaft 2 is not shown, but the front bearing 3 of the main shaft is shown.

As can be viewed, the embodiment comprises the electrical conductors 5 such as cables, one for each of the blades of a preferred wind turbine. However, it will be possible to apply more electrical conductors than only one for each blade, and it will be possible to apply the lightning protection system with wind turbines having another number of blades such as one blade, two blades or more than three blades. Finally, it will be possible to connect the electrical conductors from each blade to one common conductor inside the hub, and just pass the one conductor to the mounting flange and further on to the annular member.

The annular member 4 extends along an entire circular circumference. It will be possible, although not preferable, to divide the annular member into a plurality of sections, perhaps three sections, one section for each electrical conductor. If only one of the blades during lightning is struck by a lightning, only the electric conductor from that blade and thus only the section of the annular member, onto which that electrical conductor is attached, will pass the electrical current to the stationary part. The other sections of the annular member will not participate in the conducting of the electrical current from the one blade.

Figure 7:
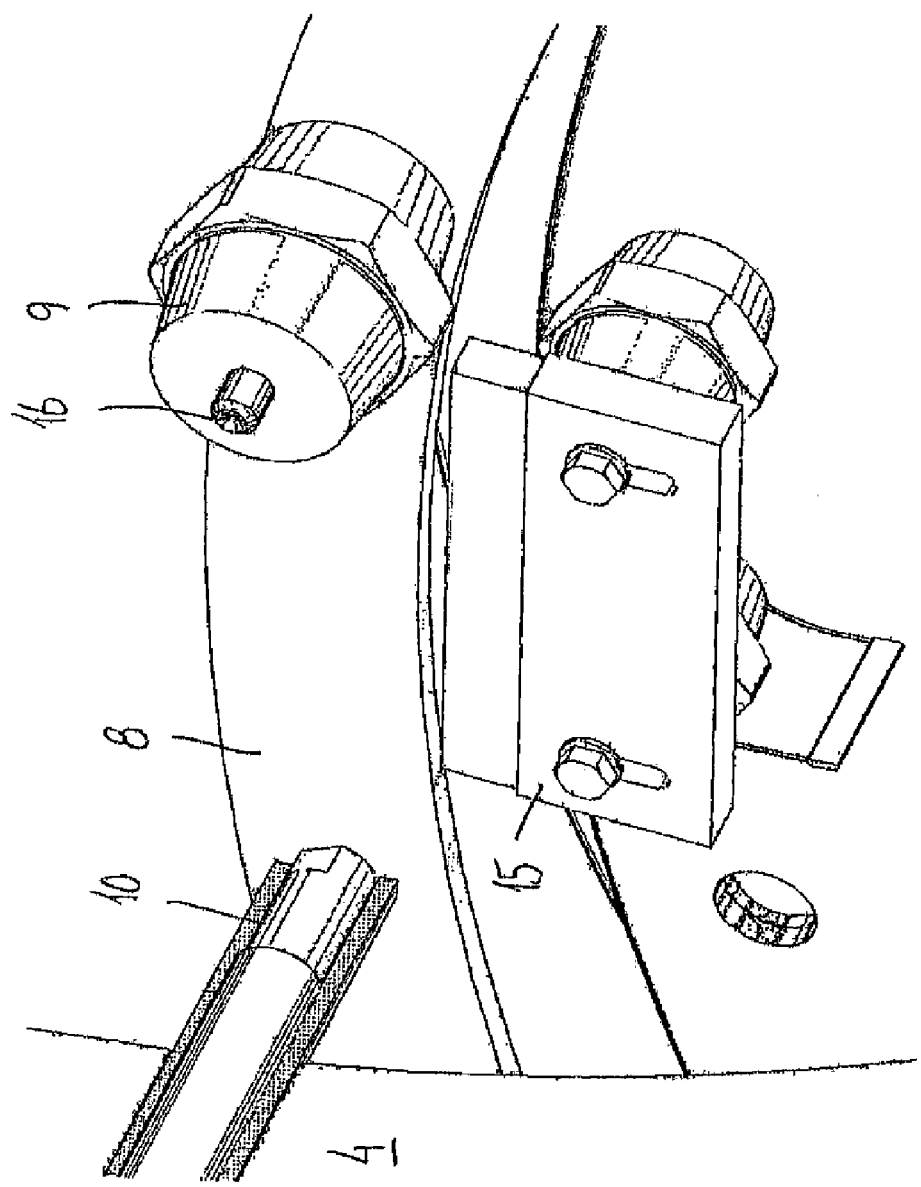
FIG. 7 is a perspective view of static discharge unit provided in addition to and as a supplement to the lightning protection means according to the invention.

FIG. 7 shows a possible embodiment of a unit 15 capable of discharging any static electricity that may be formed between the annular member 8 and the stationary part of the nacelle, onto which the electrical current is passed from the annular member 8. In the embodiment shown, the electrical current is passed from the annular member 8 to a front cover plate of the front bearing 3 of the main shaft. Accordingly, the static discharge unit is mounted to the front cover plate. The static discharge unit 15 consists in a brush mounted to the front plate of the bearing through electrically insulating insulators 9, the proximate end of which holds the discharge brush 15 by means of bolts or nuts and the distant end of which is secured to the front plate of the bearing.

A threaded bolt 16 is shown extending from the one end of the insulator 9, and the function of which is described with reference to FIG. 5. In the embodiment shown (see FIG. 6) only one static discharge unit 15 is provided. However, it will be possible to provide more than one static discharge unit 15, and it will be possible to provide the one or more static discharge units 15 to other elements in the nacelle than the front plate of the front bearing of the main shaft. Alternatively to the static discharge unit shown in FIG. 5, a resistor could be provided over the insulator attaching the annular member to the mounting flange.

FIGS. 8-11 show different embodiments of the so-called lightning current receptors 10. The lightning current receptors are intended for establishing the slip connection between the annular member 4 and the front bearing of the main shaft, the stationary part inside the nacelle, which the current, in the embodiment shown, initially is passed on to.

Figure 8:
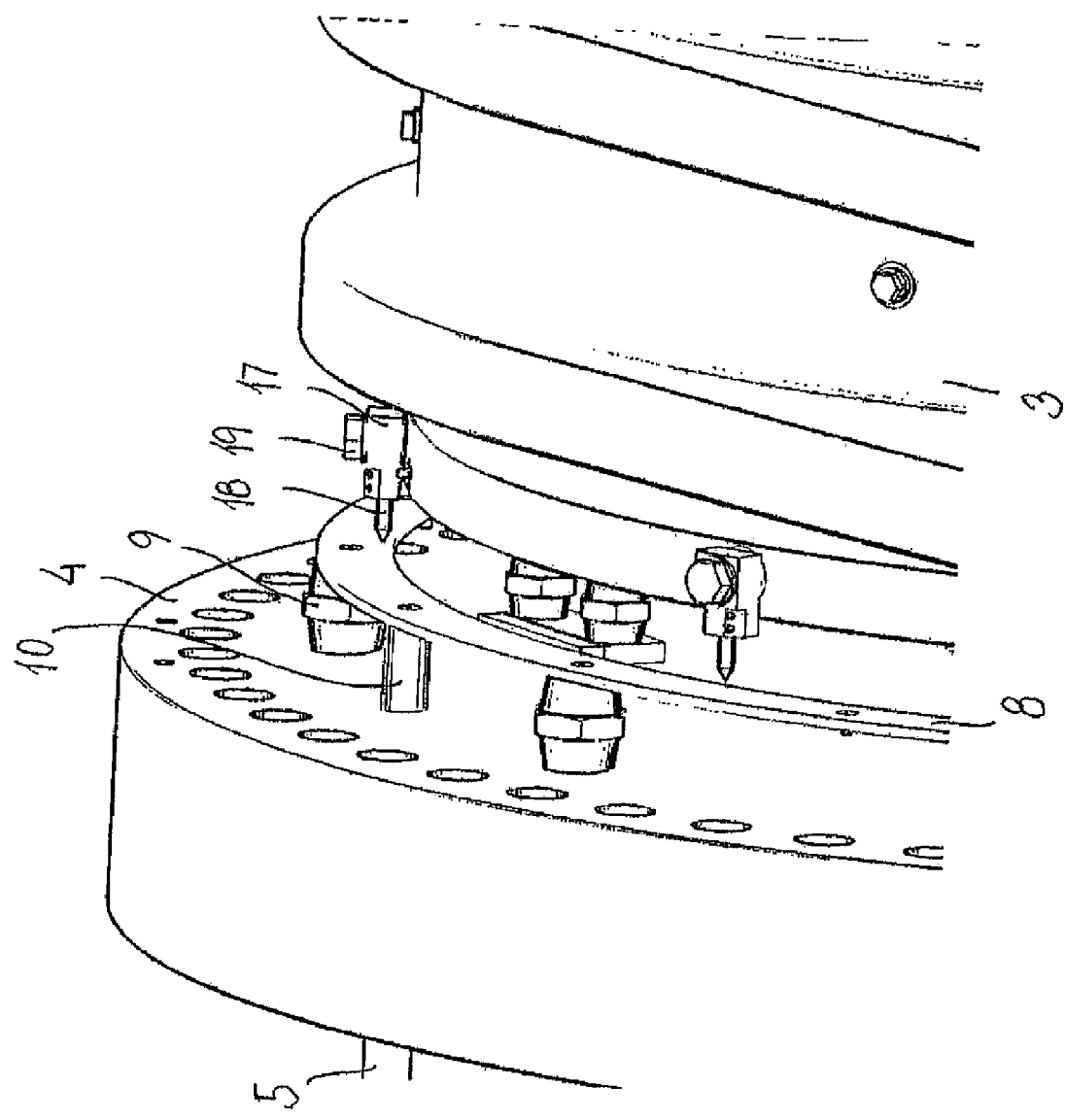
FIG. 8 is a perspective view of a possible embodiment of a lightning current receptor constituting part of the lightning protection system according to the invention

FIG. 8 shows a first embodiment of a lightning current receptor 10 similar to the lightning current receptors shown in FIGS. 1-3. The lightning current receptor consists in a base 17 and a pointed tip 18, said pointed pin directed towards the annular member 4. The base 17 is by means of a bolt 19 secured to the front bearing 3 of the main shaft. A gap is providing a distance between the annular member 4 and the very point of the pointed tip 18.

When electrical current is established from a lightning striking one or more of the blades of the wind turbine, the current is conducted to the annular member. A spark will be formed between the annular member and one or more of the tips of the pointed pins of the lightning current receptor. From the lightning current receptors, the current will be passed further on along the front bearing of the main shaft to stationary parts of the wind turbine, such as the tower and further down the tower to the ground.

Figure 9:
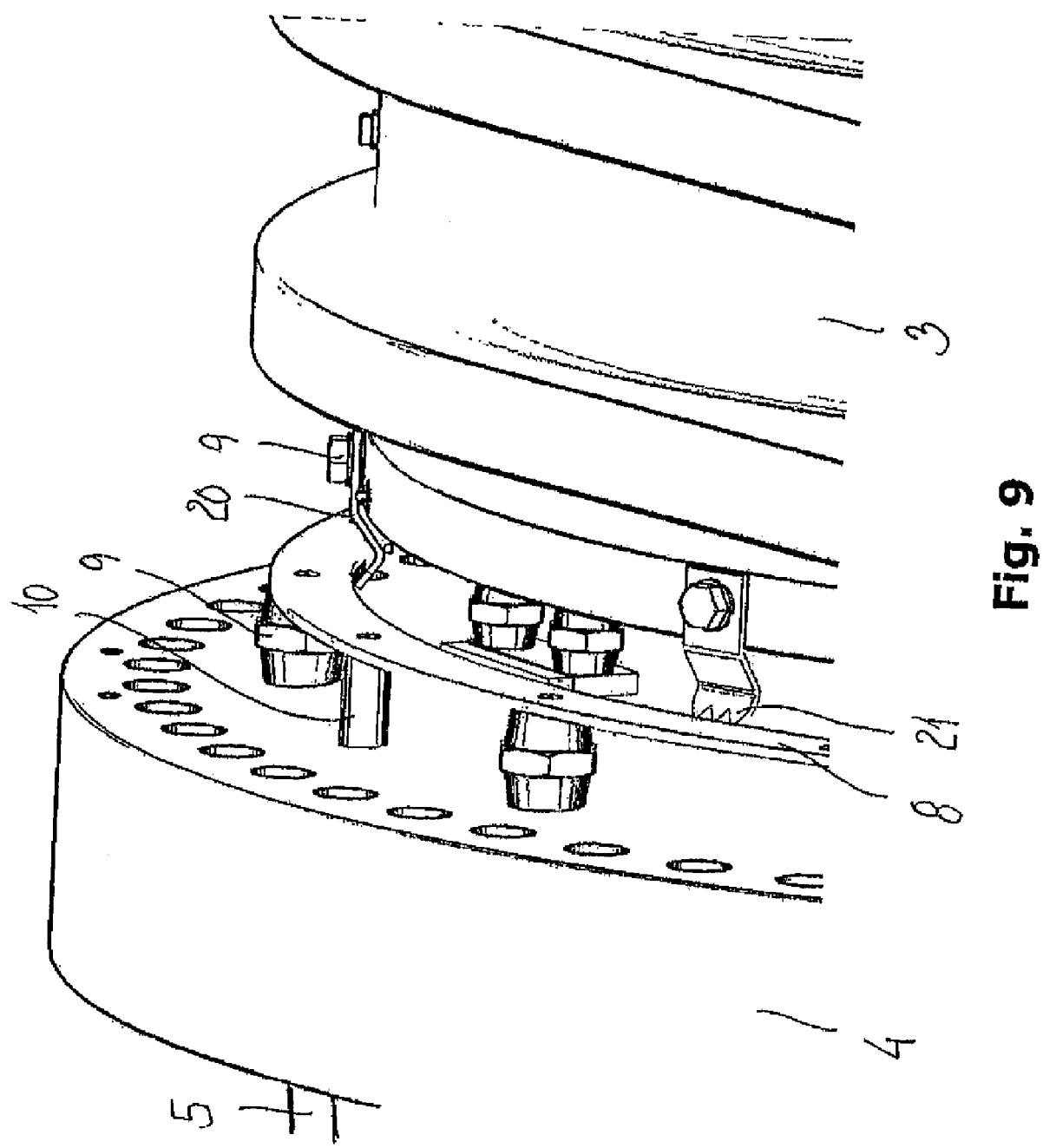
FIG. 9 is a perspective view of a possible other embodiment of a lightning current receptor constituting part of the lightning protection system according to the invention

FIG. 9 shows a second embodiment of a lightning current receptor a little different than the lightning current receptors shown in FIGS. 1-3. The lightning current receptor consists in plate member 20 having a tip consisting in pointed prongs 21, said pointed prongs 21 directed towards the annular member 4. The plate member is by means of a bolt 19 secured to the front bearing 3 of the main shaft. A gap is providing a distance between the annular member 4 and the pointed prongs 21. The plate member is bent in such a manner that the radial distance between an inner circumference of the annular member and the prongs of the lightning current receptor is smaller than an axial distance between the surface 4B of the annular member 4, and facing the bearing 3, and the prongs 21 of the lightning current receptor.

When electrical current is established from a lightning striking one or more of the blades of the wind turbine, the current is conducted to the annular member. A spark will be formed between the inner circumference of the annular member and the pointed tips of one or more of the plate members constituting the lightning current receptor. From the lightning current receptors, the current will be passed further on along the front bearing of the main shaft to stationary parts of the wind turbine, such as the tower and further down the tower to the ground.

Figure 10:
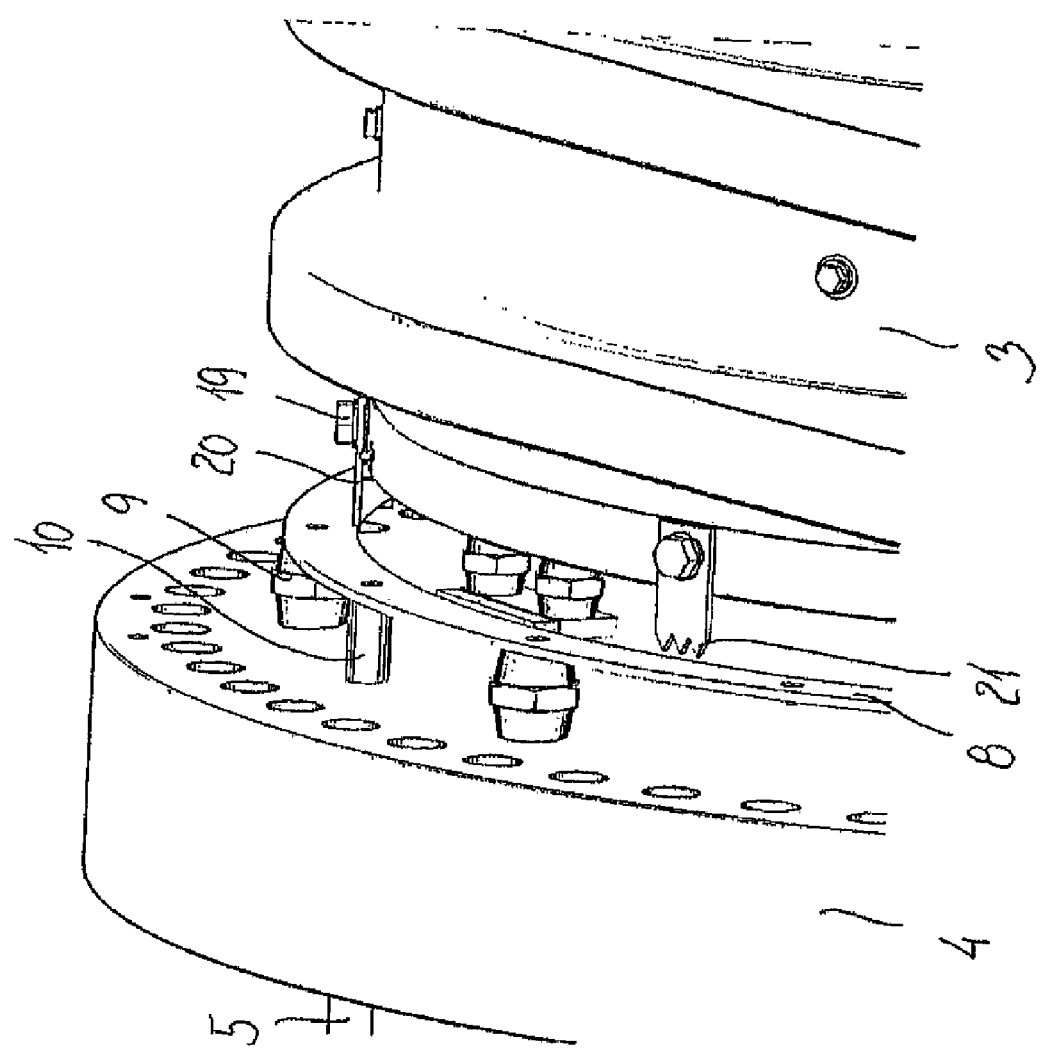
FIG. 10 is a perspective view of a possible yet other embodiment of a lightning current receptor constituting part of the lightning protection system according to the invention

FIG. 10 shows a second embodiment of a lightning current receptor a little different than the lightning current receptors shown in FIGS. 1-3. The lightning current receptor consists in plate member 20 having a tip constituted by pointed prongs 21, said pointed prongs 21 directed towards the annular member 4. The plate member 20 is by means of a bolt 19 secured to the front bearing 3 of the main shaft. A gap is providing a distance between the annular member 4 and the pointed prongs 21. The plate member is not bent, as is the plate member of the lightning current receptor shown in FIG. 9, but is directed straight towards the annular member. Thus, the distance between the annular member and the prongs of the lightning current receptor is the axial distance between the surface 4B of the annular member, facing the bearing 3, and the prongs 21 of the lightning current receptor.

When electrical current is established from a lightning striking one or more of the blades of the wind turbine, the current is conducted to the annular member. A spark will be formed between the surface of annular member and the pointed tips of one or more of the plate members constituting the lightning current receptor. From the lightning current receptors, the current will be passed further on along the front bearing of the main shaft to stationary parts of the wind turbine, such as the tower and further down the tower to the ground.

Alternative embodiments to the ones shown in FIGS. 8-10 may be the following: The pointed tips of the lightning current receptors need not be pointed tips but may instead be tips with no pointed shape, such as cylindrically shaped tips. The lightning current receptors need not constitute single separate members in relation to the number of lightning current receptors. The pointed or non-pointed tips of the receptors may be constituted by a ring encircling the front plate of the bearing, said ring being provided with tips at selected positions along the circumference of the ring, and said tips extending axially from the ring towards the annular member. The gap established between the annular member an the pointed or non-pointed tips of the lightning current receptors may be established along the outer circumference of the annular member as an alternative to along the inner circumference or along the surface facing the receptors.

FIG. 11 is a cross-sectional view of the embodiment shown in FIG. 10. The electric cable is received from the hub of the wind turbine and attached by means of cable plug to the insulating sleeves such as an APE having a core for conducting electrical current. The electrically insulating sleeve is supported in a hole provided in the mounting flange for mounting the hub to the main shaft of the wind turbine. The insulating sleeve with the conducting core is attached to the annular member. The annular member is secured to a rear side of the mounting flange by means of electrically insulating insulators.

During operation of the wind turbine, the mounting flange together with the main shaft will rotate. Thus, also the electric cables, the insulating sleeves with the conducting core, the annular member and the insulators attaching the annular member to the rear side of the mounting flange will all rotate together with the mounting flange, the main shaft, the hub of the wind turbine and the blades of the wind turbine.

During operation, the front bearing of the main shaft will however not rotate. Accordingly, the lightning current receptors, which are secured to the bearing, will not rotate, either. Therefore the gap between the annular member and the pointed tips or tips of the lightning current receptors is established. By adjusting the position of the lightning current receptors it will be possible to adjust the magnitude of the gap, i.e. the distance between the annular member and the tips or tips of the lightning current receptors. By adjusting said distance, it is possible to adjust at which potential difference a spark will be formed in the gap between the annular member and the tips or tips of the lightning current receptors.

Generally speaking, during lightning, the blades of the wind turbine may be struck by a lightning. The blades are provided with electrical conductors of commonly known type running along the lengths of the blades. The electrical conductors of the blades run to the base of the blades and the electrical current is passed to the electrical conductors constituting part of the present invention. The electrical current is then passed along the electrical conductors of the invention from the base of the blade inside the hub, through the mounting flange and to the annular member.

When the electrical current reaches the annular member, the electrical currents pass on to the tips of the lightning current receptors by traversing the small gab as a spark running from the annular member to the tip of one or more lightning current receptors. From the lightning current receptors the electrical current is passed to the ground either through the bearing and perhaps through the metal of the tower, or through specially adapted means (not shown) for leading the current from the lightning current receptors to the ground, perhaps along wires suspended in the tower.

In an alternative embodiment, in stead of the annular member being attached to the mounting flange and the lightning current receptors being secured to the stationary part in relation to the mounting flange, the lightning current receptors may be attached to the mounting plate and the annular member secured to the stationary part. Thus, in stead of the annular member rotating with the mounting flange, the lightning current receptors will be rotating with the mounting flange. However, the function of the lightning current receptors and the annular member will be exactly the same, also if the lightning current receptors are provided with metal brushes or carbon brushes at the tips in stead of being pointed for creating a spark gap.

The invention claimed is:

1. A wind turbine lightning protection means, said means comprising means for conducting an electrical current induced by a lightning, said means capable of conducting the electrical current from blades of the wind turbine, and said means comprising electrical conductor means passing along the base of the blades, through the hub and to a stationary part of the wind turbine by leading the electric conductor means past a flange for mounting the hub to a main shaft of the wind turbine, said stationary part of the wind turbine being stationary in relation to the mounting flange during operation of the wind turbine, and where leading of the electrically conducting means past the mounting flange is established by one of the following means: fastening means provided in or attached to the circumference of the mounting flange for fastening the electrically conducting means to the circumference of the mounting flange, or through-going holes in the mounting flange for passing the electrically conducting means through the mounting flange.

2. A wind turbine lightning protection system according to claim 1, said electrical conductor means leading past the mounting flange electrically insulated from the mounting flange.

3. A wind turbine lightning protection means according to claim 1, where leading of the electrical conductor means past the mounting flange are provided by leading the electrical conductor means past the circumference of the mounting flange.

4. A wind turbine lightning protection system according to claim 3, where electrical insulation is provided between the electrical conductor means and the circumference of the mounting flange.

5. A wind turbine lightning protection means according to claim 1, where leading of the electrical conductor means past the mounting flange are provided by leading the electrical conductor means through the mounting flange.

6. A wind turbine lightning protection system according to claim 5, where electrical insulation is provided between the electrical conductor means and holes in the mounting flange.

7. A wind turbine lightning protection means according to claim 1, where the electrical conductor means comprises an annular member provided around the main shaft of the wind turbine, and said annular member being electrically insulated from the mounting flange and from the main shaft.

8. A wind turbine lightning protection means according to claim 7, where the annular member is attached to the mounting flange, thus rotating with the mounting flange, the main shaft and the hub during operation of the wind turbine, and where slip means are provided between the annular member and the stationary part of the wind turbine, said slip means conducting the electrical current from the annular member to the stationary part.

9. A wind turbine lightning protection means according to claim 8, where the slip means are a number of metal brushes abutting the annular member and sliding along the annular member, when the mounting flange is rotating during operation of the wind turbine.

10. A wind turbine lightning protection means according to claim 9, where the slip means being a number of metal brushes abutting the annular member and sliding along the annular member, is secured to the stationary part of the wind turbine.

11. A wind turbine lightning protection means according to claim 8, where the slip means are a number of carbon brushes abutting the annular member and sliding along the member, when the mounting flange is rotating during operation of the wind turbine.

12. A wind turbine lightning protection means according to claim 11, where the slip means being a number of carbon brushes abutting the annular member and sliding along the annular member, is secured to the stationary part of the wind turbine.

13. A wind turbine lightning protection means according to claim 8, where the slip means are a number of spatial gaps, said gaps constituting spark gaps for the electrical current to pass in the form of sparks from the annular member.

14. A wind turbine lightning protection means according to claim 13, where the slip means being a number of gaps is established between the annular member and a number of lightning current receptors, said receptors being is secured to the stationary part of the wind turbine.

15. A wind turbine lightning protection system according to claim 8, where the receptors is constituted by a pointed end neighboring a surface of the annular member substantially lying in a plane perpendicular to a rotating axis of the main shaft.

16. A wind turbine lightning protection system according to claim 13, where the receptors is constituted by a pointed end neighboring an inner circumference of the annular member, said circumference surrounding the rotating axis of the main shaft.

17. A wind turbine lightning protection system according to claim 13, where the receptors is constituted by a pointed end neighboring an outer circumference of the annular member, said circumference surrounding the rotating axis of the main shaft.

18. A wind turbine lightning protection system according to claim 14, where a radial distance in relation to the rotating axis of the main shaft between the annular member and the pointed end of each of the lightning current receptors is smaller than an axial distance in relation to the rotating axis of the main shaft between the annular member and the remainder of each of the lightning current receptors.

19. A wind turbine lightning protection system according to claim 14, where an axial distance in relation to the rotating axis of the main shaft between the annular member and the pointed end of each of the lightning current receptors is smaller than a radial distance in relation to the rotating axis of the main shaft between the annular member and the remainder of each of the lightning current receptors.

20. A wind turbine lightning protection system according to claim 19, where the pointed tip of the lightning current receptor is cylindrically shaped with the pointed end of the cylindrical shape being directed towards the annular member.

21. A wind turbine lightning protection system according to claim 14, where the pointed tip of the lightning current receptor is conically shaped with the pointed end of the conical shape being directed towards the annular member.

22. A wind turbine lightning protection system according to claim 14, where the pointed tip of the lightning current receptor is frusto-conically shaped with the pointed end of the frusto-conical shape being directed towards the annular member.

23. A wind turbine lightning protection system according to claim 14, where the pointed tip of the lightning current receptor is pyramidally shaped with the pointed end of the pyramidal shape being directed towards the annular member.

24. A wind turbine lightning protection system according to claim 14, where the pointed tip of the lightning current receptor is triangularly shaped with the pointed end of the triangular shape being directed towards the annular member.

25. A wind turbine lightning protection system according to claim 14, where the pointed tip of the lightning current receptor is shaped like a fork with a number of prongs with the pointed end of the number of prongs being directed towards the annular member.

26. A wind turbine lightning protection means according to claim 7, where the annular member is attached to the stationary part of the wind turbine, thus not rotating with the mounting flange, the main shaft and the hub during operation of the wind turbine, and where slip means are provided between the annular member and the mounting flange, said slip means conducting the electrical current from the mounting flange to the annular member.

27. A wind turbine lightning protection means according to claim 26, where the slip means are a number of metal brushes abutting the annular member and sliding along the annular member, when the mounting flange is rotating during operation of the wind turbine.

28. A wind turbine lightning protection means according to claim 26, where the slip means being a number of metal brushes abutting the annular member and sliding along the annular member, is secured to the mounting flange.

29. A wind turbine lightning protection means according to claim 27, where the slip means being a number of metal brushes abutting the annular member and sliding along the annular member, is secured to the mounting flange.

30. A wind turbine lightning protection means according to claim 26, where the slip means are a number of carbon brushes abutting the annular member and sliding along the member, when the mounting flange is rotating during operation of the wind turbine.

31. A wind turbine lightning protection means according to claim 30, where the slip means being a number of carbon brushes abutting the annular member and sliding along the annular member, is secured to the mounting flange.

32. A wind turbine lightning protection means according to claim 26, where the slip means are a number of spatial gaps, said gaps constituting spark gaps for the electrical current to pass in the form of sparks from the annular member.

33. A wind turbine lightning protection means according to claim 32, where the slip means being a number of gaps is established between the annular member and a number of lightning current receptors, said receptors being secured to the mounting flange.

34. A wind turbine lightning protection system according to claim 32, where the receptors is constituted by a pointed end neighboring a surface of the annular member substantially lying in a plane perpendicular to a rotating axis of the main shaft.

35. A wind turbine lightning protection system according to claim 32, where the receptors is constituted by a pointed end neighboring an inner circumference of the annular member, said circumference surrounding the rotating axis of the main shaft.

36. A wind turbine lightning protection system according to claim 32, where the receptors is constituted by a pointed end neighboring an outer circumference of the annular member, said circumference surrounding the rotating axis of the main shaft.

37. A wind turbine lightning protection system according to claim 32, where a radial distance in relation to the rotating axis of the main shaft between the annular member and the pointed end of each of the lightning current receptors is smaller than an axial distance in relation to the rotating axis of the main shaft between the annular member and the remainder of each of the lightning current receptors.

38. A wind turbine lightning protection system according to claim 32, where an axial distance in relation to the rotating axis of the main shaft between the annular member and the pointed end of each of the lightning current receptors is smaller than a radial distance in relation to the rotating axis of the main shaft between the annular member and the remainder of each of the lightning current receptors.

39. A wind turbine lightning protection system according to claim 32, where the pointed tip of the lightning current receptor is cylindrically shaped with the pointed end of the cylindrical shape being directed towards the annular member.

40. A wind turbine lightning protection system according to claim 32, where the pointed tip of the lightning current receptor is conically shaped with the pointed end of the conical shape being directed towards the annular member.

41. A wind turbine lightning protection system according to claim 32, where the pointed tip of the lightning current receptor is frusto-conically shaped with the pointed end of the frusto-conical shape being directed towards the annular member.

42. A wind turbine lightning protection system according to claim 32, where the pointed tip of the lightning current receptor is pyramidally shaped with the pointed end of the pyramidal shape being directed towards the annular member.

43. A wind turbine lightning protection system according to claim 32, where the pointed tip of the lightning current receptor is triangularly shaped with the pointed end of the triangular shape being directed towards the annular member.

44. A wind turbine lightning protection system according to claim 32, where the pointed tip of the lightning current receptor is shaped like a fork with a number of prongs with the pointed end of the number of prongs being directed towards the annular member.

45. A wind turbine lightning protection means according to claim 32, where the annular member is attached to the stationary part of the wind turbine, thus not rotating with the mounting flange, the main shaft and the hub during operation of the wind turbine, and where slip means are provided between the annular member and the mounting flange, said slip means conducting any static electricity, being formed apart from the electrical current of the lightning, from the mounting flange to the annular member.

46. A wind turbine lightning protection means according to claim 45, where the slip means are a number of metal brushes abutting the annular member and sliding along the annular member, when the mounting flange is rotating during operation of the wind turbine.

47. A wind turbine lightning protection means according to claim 46, where the slip means being a number of metal brushes abutting the annular member and sliding along the annular member, is secured to the stationary part of the wind turbine.

48. A wind turbine lightning protection means according to claim 47, where the slip means being a number of metal brushes abutting the annular member and sliding along the annular member, is secured to the mounting flange.

49. A wind turbine lightning protection means according to claim 46, where the slip means are a number of carbon brushes abutting the annular member and sliding along the member, when the mounting flange is rotating during operation of the wind turbine.

50. A wind turbine lightning protection means according to claim 46, where the slip means being a number of carbon brushes abutting the annular member and sliding along the annular member, is secured to the stationary part of the wind turbine.

51. A wind turbine lightning protection means according to claim 50, where the slip means being a number of carbon brushes abutting the annular member and sliding along the annular member, is secured to the mounting flange.

52. A wind turbine lightning protection means according to claim 46, where the slip means are a number of spatial gaps, said gaps constituting spark gaps for the static electricity to pass in the form of sparks from the annular member.

53. A wind turbine lightning protection means according to claim 46, where the slip means being a number of gaps is established between the annular member and a number of static discharge units, said units being is secured to the stationary part of the wind turbine.

54. A wind turbine lightning protection means according to claim 46, where the slip means being a number of gaps is established between the annular member and a number of static discharge units, said units being secured to the mounting flange.

55. Method for conducting electrical current induced by lightning from the blades of a wind turbine to a stationary part of the wind turbine in relation to a mounting flange of the wind turbine, said method comprising passing the electrical current along electrical conductors and past the mounting flange from a front side of the mounting flange to a rear side of the mounting flange and past the circumference of the mounting flange.

56. Method for conducting electrical current induced by lightning from the blades of a wind turbine to a stationary part of the wind turbine in relation to a mounting flange of the wind turbine, said method comprising passing the electrical current along electrical conductors through the mounting flange from a front side of the mounting flange to a rear side of the mounting flange.

57. A mounting flange for mounting the hub to a main shaft of a wind turbine for conducting electrical current, induced by a lightning, along electrical conductors extending from the blades of the wind turbine through the hub, where the mounting flange comprises fastening means provided in or attached to the circumference of the mounted flange for fastening the electrically conducting means to the circumference of the mounting flange, or through-going holes for passing the electrically conducting means through, and an annular member or number of static discharge units connected to the electrical conductors and for discharging the electric current to a stationary part of the wind turbine.

* * * * *